United States Patent
Brandin et al.

(10) Patent No.: US 6,826,438 B1
(45) Date of Patent: Nov. 30, 2004

(54) METHOD AND DEVICE FOR DESIGNING THE CONTROL OF AN OVERALL PROCESS

(75) Inventors: Bertil Brandin, München (DE); Markus Kaltenbach, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/721,000

(22) PCT Filed: Jul. 1, 1999

(86) PCT No.: PCT/DE99/01915
§ 371 (c)(1),
(2), (4) Date: Jan. 3, 2001

(87) PCT Pub. No.: WO00/02107
PCT Pub. Date: Jan. 13, 2000

(30) Foreign Application Priority Data
Jul. 3, 1998 (DE) .......................... 198 29 804

(51) Int. Cl.[7] ............................... G06F 9/00
(52) U.S. Cl. ............ 700/103; 700/97; 700/2; 700/11; 718/106; 718/100; 709/201
(58) Field of Search .............. 718/1, 100–108; 700/2, 4, 11, 12, 23–26, 97, 99–103; 709/201, 208

(56) References Cited

U.S. PATENT DOCUMENTS

| | | | | |
|---|---|---|---|---|
| 4,579,444 A | * | 4/1986 | Pinckney et al. | 355/14 SH |
| 5,138,713 A | * | 8/1992 | Loten | 395/725 |
| 5,212,881 A | | 5/1993 | Nishitsuka et al. | 29/740 |
| 5,428,555 A | * | 6/1995 | Starkey et al. | 364/551.01 |
| 5,452,461 A | * | 9/1995 | Umekita et al. | 395/700 |
| 5,584,019 A | * | 12/1996 | Kikuchi et al. | 395/500 |
| 5,696,956 A | * | 12/1997 | Razdan et al. | 395/568 |
| 5,740,033 A | | 4/1998 | Wassick et al. | 364/149 |
| 5,742,823 A | * | 4/1998 | Edwards et al. | 395/672 |
| 5,764,948 A | * | 6/1998 | Le Van Suu | 395/500 |
| 6,009,454 A | * | 12/1999 | Dummermuth | 709/108 |
| 6,065,037 A | * | 5/2000 | Hitz et al. | 709/200 |
| 6,247,064 B1 | * | 6/2001 | Alferness et al. | 709/312 |

FOREIGN PATENT DOCUMENTS

| | | |
|---|---|---|
| DE | 196 39 424 | 3/1997 |
| DE | 196 37 917 | 3/1998 |

OTHER PUBLICATIONS

Despang, H.G. et al, "Rechnergestuetzter Entwurf von Automatisierungsanlagen unter Nutzung von Petri–Netzen Am Beispiel Einer Paketverteilanlage" CAD of control systems using Petri nets for the example of a parcel distributor in a post office, AT Automatisierungstechnik, vol. 41, No. 8, (1993), pp. 307–316.

Friedrich, Alfred, "Netz Der Netze Wie SPS–Orientierte Petrinetze Die Transparenz von Prozessen Erhoehen Koennen", 312 Elektrotechnik, vol. 76, No. 4 (1994), pp. 44–47.

Jörg Schneider: "Fehlerreaktion Mit Speicherprogrammierbaren Steuerungen–Ein Beirtrag Zur Fehlertoleranz", (1994) pp. 103–108.

Fleckenstein, J.; "Zustandsgraphen Für SPS–Graphikunterstützende Programmierung Und Steuerungsabhängige Darstellung" (1997), pp. 16–43.

\* cited by examiner

*Primary Examiner*—Albert W. Paladini
*Assistant Examiner*—Sean Shechtman
(74) *Attorney, Agent, or Firm*—Harness, Dickey & Pierce, P.L.C.

(57) ABSTRACT

A method for designing a control of a complete process (which can have a number of individual processes) can include: identifying functionalities of the individual processes; performing a validation by automatically verifying future interplay of the functionalities in accordance with an input to the complete process and producing a validation result; and determining data for future controlling of the complete process from the validation result. A process unit can be arranged to carry out such a method.

16 Claims, 10 Drawing Sheets

FIG 7
System behaviour
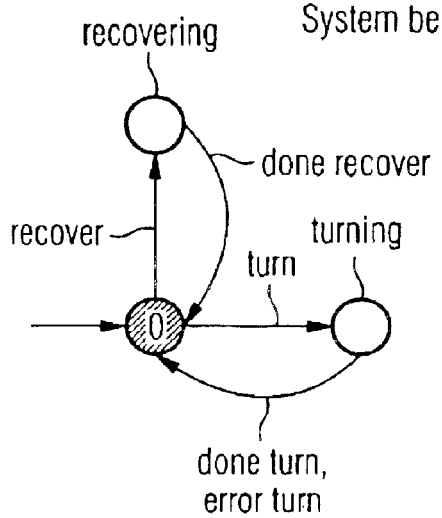
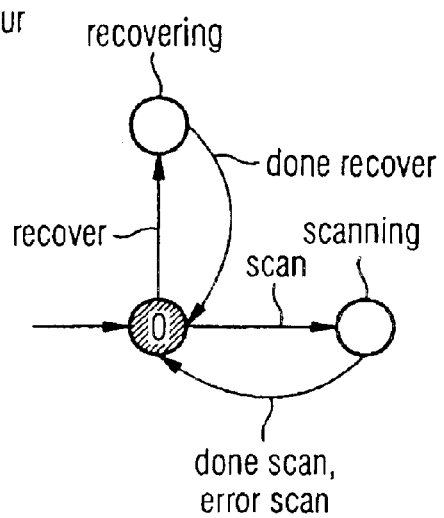
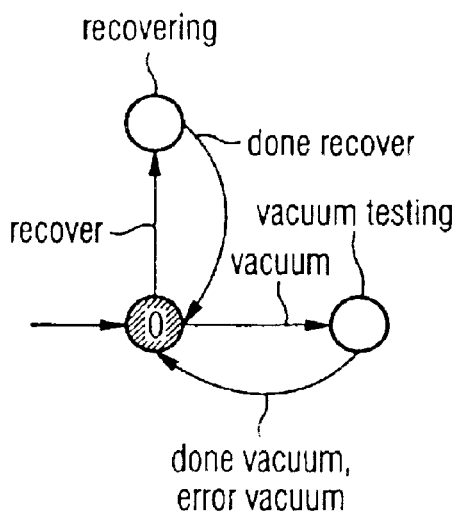
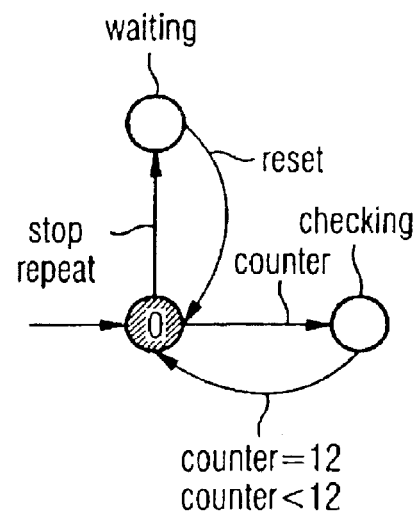
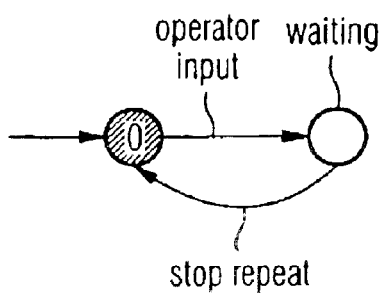

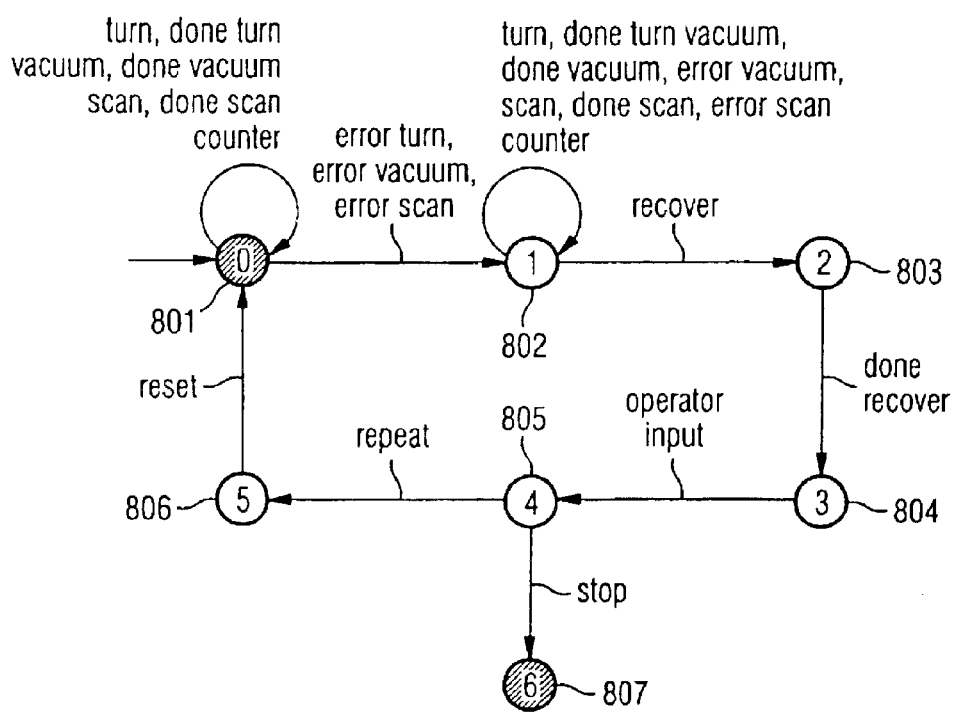
FIG 8  Specified behaviour (error recovry)

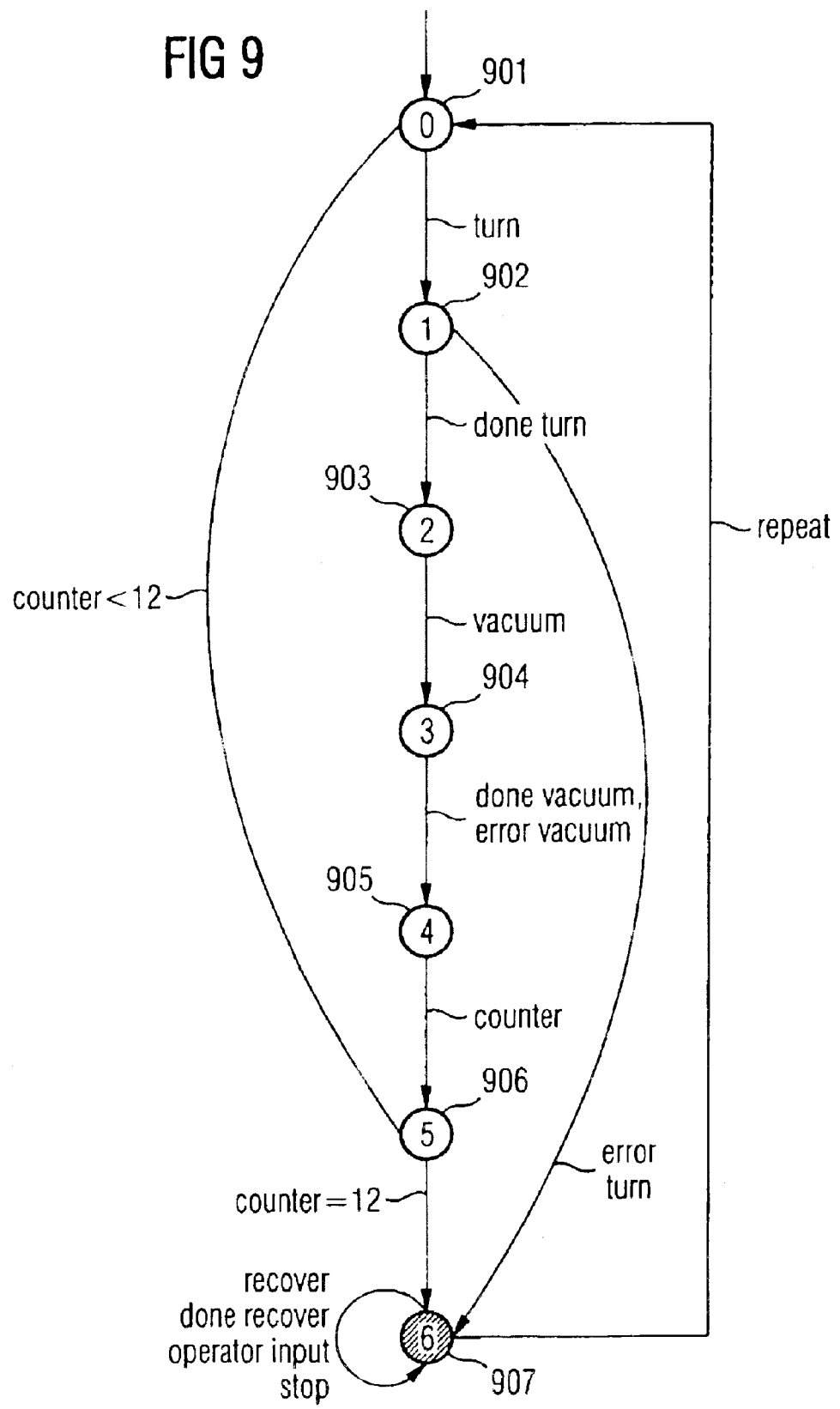

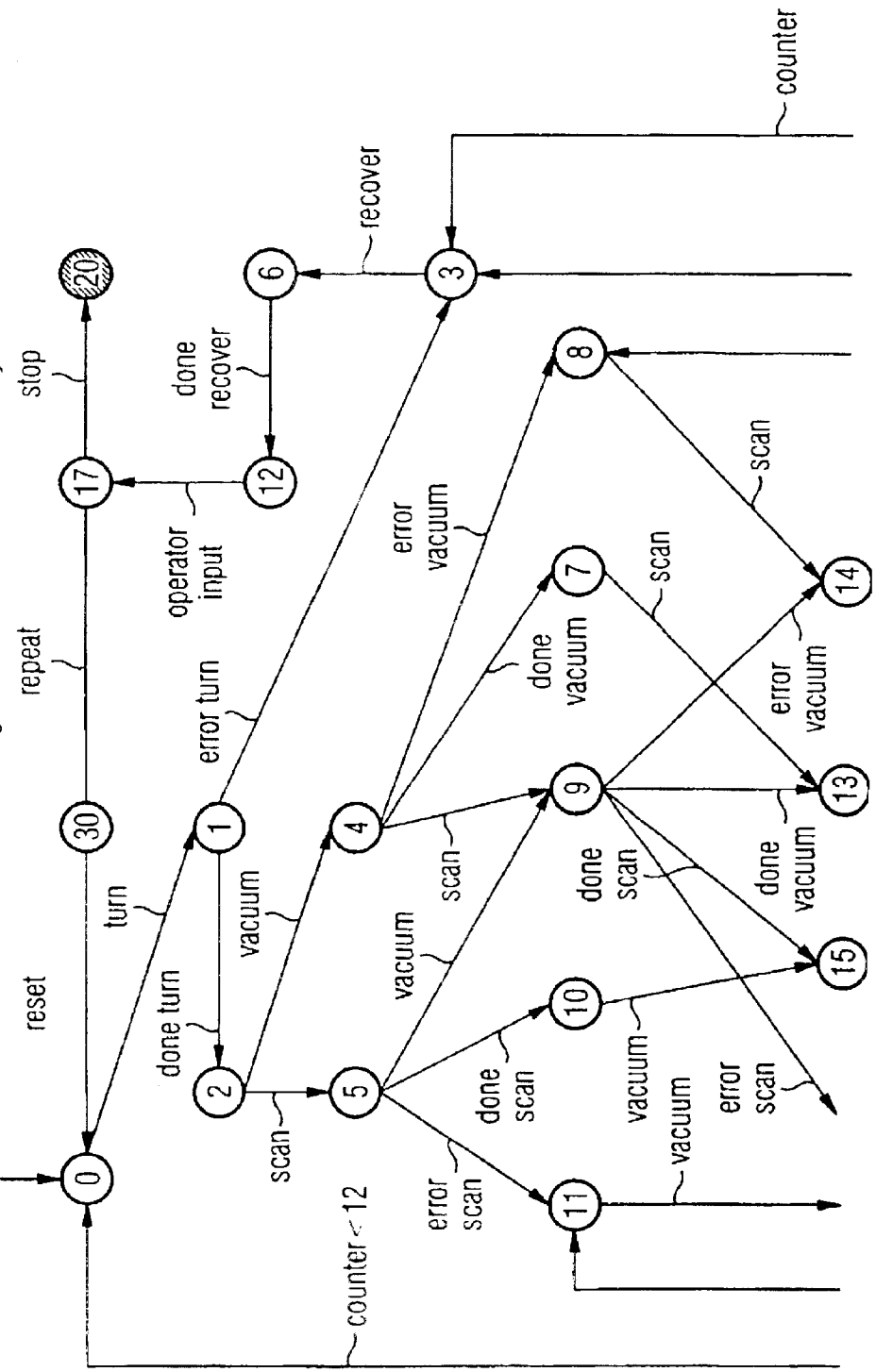
FIG 10A Non-blocking behaviour of the coordinated system

METHOD AND DEVICE FOR DESIGNING THE CONTROL OF AN OVERALL PROCESS

BACKGROUND OF THE INVENTION

1. Field of the Invention

The invention relates to a method and an arrangement for designing the control of a complete process which comprises a number of individual processes.

2. Description of the Related Art

The control of a complex technical installation or of a system (a complete process) comprises a number of smaller control units which are provided for certain parts (individual processes) of the installation or of the system. A first control unit for a first individual process is restricted in this case to this individual process. The same applies to a second control for a second individual process. Even if an interplay of the first control with the second control functions largely without errors, this does not guarantee that an error-free operation of the complete installation is still guaranteed with a slight modification of the first or of the second individual process. Thus, a small change in one of these processes or the addition of a third process can lead to conflicts and blocking between the processes which can only be empirically verified. In this context, it is possible that a faulty state of the complete process overcomes an empirical test and thus remains undetected. This is not acceptable, especially with regard to a critical installation with respect to safety since it must be guaranteed in every case that no unpredicted event occurs in the interplay of the processes.

Apart from the unauthorized states to be avoided, there are, in the sequence of a process, "authorized states" which should occur exclusively for the process if it is functioning correctly.

SUMMARY OF THE INVENTION

It is the object of the invention to specify a method and an arrangement for designing the control of a complete process in which it is (formally) ensured that there is no impediment to the individual processes and that only authorized states are occupied.

This object is achieved by a method for designing a control of a complete process which comprises a number of individual processes, the method comprising the steps of: identifying functionalities of the individual processes; performing a validation by automatically verifying an interplay of the functionalities in accordance with an input to the complete process, while not impeding each individual process during an operation, producing a validation result; and determining data for controlling the complete process from the validation result.

This object is also achieved by an arrangement for designing the control of a complete process, comprising a number of individual processes; and a processor unit configured to provide: a) identification of functionalities of the individual processes; b) a validation, by automatically verifying an interplay of functionalities in accordance with an input to the complete process, in a manner such that each of the individual processes is not impeded during an operation; and c) data from a result of the validation that is used for controlling the complete process.

Further developments of the invention include providing a method step of performing a sequence optimization. A step of producing data for the control in an executable code form may be provided, as may a step of controlling individual affected processes by a software unit which is one of the functionalities of the individual processes. One or more of the individual processes may be an impeding process, an impeding process being defined as such if one of the following conditions is met: an individual process is blocked by another individual process; and an individual process reaches an unauthorized state or a state endangering operation of the complete system. The inventive method may be applied to controlling individual processes of an automatic placement machine, and may also involve controlling a technical installation with data determined for controlling the complete process.

In more detail, the invention relates to a method for designing the control of a complete process which comprises a number of individual processes. In the method, functionalities of the individual processes are identified. Furthermore, a validation is performed by automatically verifying an interplay of the functionalities in accordance with an input to the complete process, to the effect that each individual process is not disturbed during the operation. From the result of the validation, data for controlling the complete process are determined.

An advantage of the method is that the step of validation ensures that each individual process can run undisturbed. A further advantage is that data is automatically generated for controlling the complete process. Thus, data for controlling the complete process are systematically generated with the aid of the method.

An embodiment is provided in which a sequence optimization is performed after the validation. Advantageously, individual processes can run undisturbed; furthermore, the several individual processes can run time-optimized if possible. It is the aim of the sequence optimization to carry out the performance of predetermined actions of the several individual processes in parallel and in the shortest possible time without disturbances.

A further development is that the data for controlling the complete process are determined in the form of an executable code. This ensures that the result of the validation and possibly of the sequence optimization flows completely automatically into the control of the complete process. For example, a program code written in the programming languages C or C++ is generated which initiates or ensures the control of the complete process.

In particular, the advantage becomes noticeable in the generation of executable code if functionalities of the individual processes are also provided in the form of respective program units. If a number of functionalities in each of a number of individual processes correspond to at least one program unit, the data which were generated in the form of executable codes are used for controlling the coordination of the individual program units or, respectively, the executable code uses the interfaces, e.g., function calls or method calls, provided by the program units.

It is also a further development that an individual process is disturbed if one of the following conditions is met:

a) The individual process is blocked by another individual process. In the case of the blocking, two individual processes wish to use one physical resource in different ways. In such a case, blocking occurs since the resource cannot meet the requirements of both individual processes at the same time.

b) The individual process reaches an unauthorized state or a state endangering the operation of the complete system. It is an essential requirement for a critical application with respect to safety that no hazardous states are assumed.

The invention also provides an arrangement for controlling a complete process that comprises a number of individual processes, a processor unit being provided which is set up in such a manner that functionalities of the individual processes can be identified. Furthermore, a validation can be performed by automatically verifying an interplay of the functionalities in accordance with an input to the complete process to the effect that each individual process is not impeded during the operation. Finally, the data resulting from the result of the validation can be used for controlling the complete process.

This arrangement is particularly suitable for carrying out the method according to the invention or one of its further developments explained above.

BRIEF DESCRIPTION OF THE DRAWINGS

In the text which follows, exemplary embodiments of the invention are shown and explained with reference to the drawings.

FIG. 7 are state diagrams showing a system behavior,

FIG. 8 is a state diagram showing a specific system behavior (error recovery);

FIG. 9 is a state diagrams which shows specific system behavior for the vacuum test;

DESCRIPTION OF THE PREFERRED EMBODIMENTS

Figure 1:
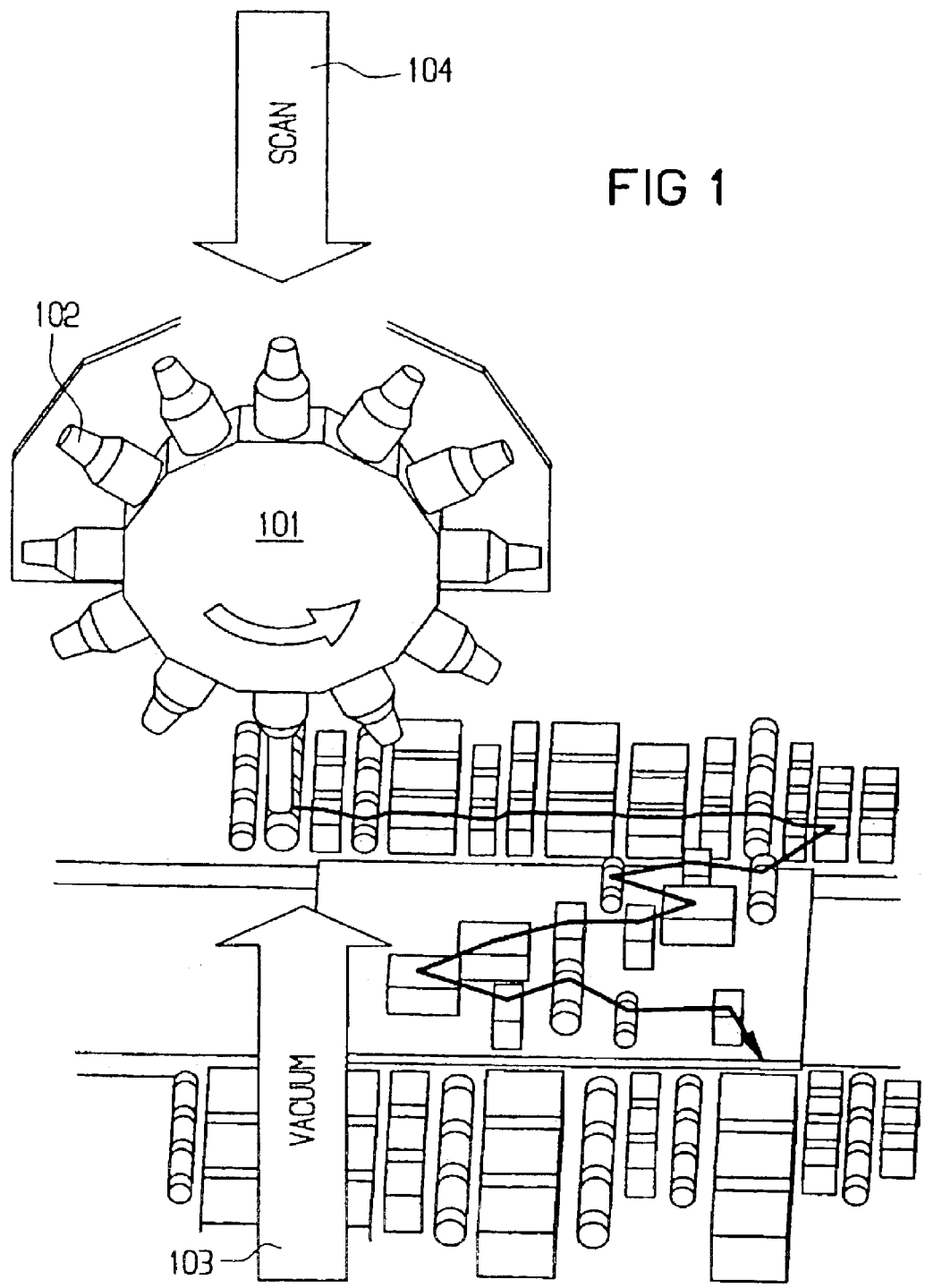
FIG. 1 is a schematic diagram showing a turret head of an automatic placement machine.

FIG. 1 shows an exemplary embodiment having a turret head 101 of an automatic placement machine. The turret head 101 accepts components and places them at a predetermined target position. The turret head contains 12 vacuum pipettes 102 which are used as receptacle and placement tool. If the turret head 101 is used for a prolonged period, wear occurs, and the vacuum pipettes become dirty and worn. Accordingly, it is necessary to perform periodic tests in order to determine the state of the vacuum pipettes 102 and to exchange them, if necessary. Two different tests are performed by two different C programs. A vacuum test 103 is used for finding out whether the respective vacuum pipette 102 can still generate the intended vacuum; a scan test 104 indicates the extent to which the individual vacuum pipette 102 is subject to physical wear and whether it needs to be exchanged. For subsequent observations, the scan test 104 and the vacuum test 103 access one and the same resource: the rotation of the turret head 101.

The text which follows explains how the control of a complete process is determined, guaranteeing freedom from conflict and providing for the execution of the vacuum test 103 and the scan test 104 at the same time without the complete process being able to assume unpredicted states. For this purpose, the function calls of the previously mentioned C programs must be coordinated.

Figure 2:
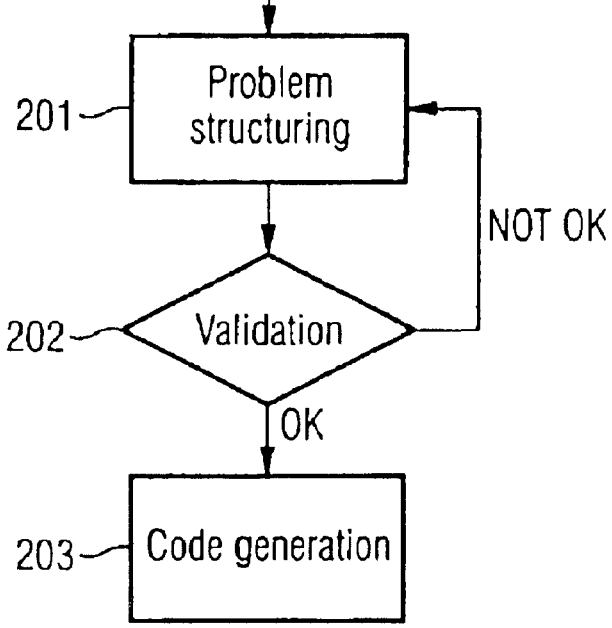
FIG. 2 is a flowchart showing steps of a method for generating the control of a complete process.

FIG. 2 shows steps of a method for generating the control of a complete process.

In a step 201, functionalities of the individual processes are identified (structuring), as well as controllable and uncontrollable events. Controllable events are events which can be avoided by the control. Uncontrollable events are events which cannot be avoided, e.g., output values of sensors or results of actions. Furthermore, sequences of events are identified which represent a possible physical system behavior. In addition, sequences of events are identified which represent a specific system behavior (task-related system behavior) under the influence of the control.

Figure 3:
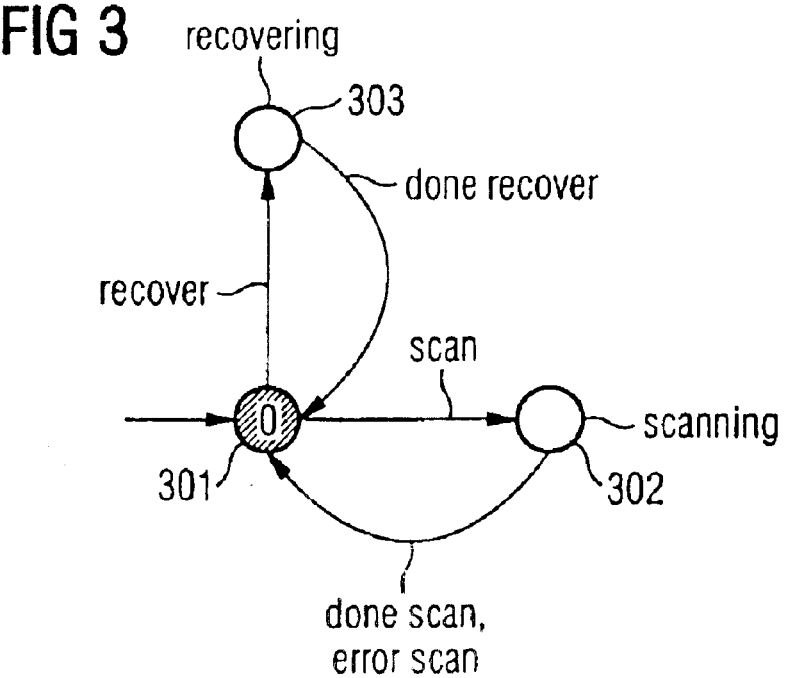
FIG. 3 is a state diagram showing the system behavior of the "scan" operation.

The step of structuring 201 also comprises the representation of a state machine as shown in FIG. 3 for the "scan behavior".

From an initial state 301, a "scan" command places the machine into a state 302 in which the vacuum pipette 102 is examined for wear. If the "scanning" Is concluded, the machine returns to state 301. Similarly, the machine returns to state 301 from state 302 when an error occurs (e.g., error the process of scanning indicates that the vacuum pipette 102 must be replaced). A "recover" command changes state 301 to a state 303 in which the machine returns to the starting conditions (recovering). If the "recovering" process is ended, the machine jumps back into state 301 ("done recover").

The specific system behavior is also shown in the form of a state machine/diagram. For this purpose, FIG. 4 shows a state machine which corresponds to the specific system behavior for the coordination of the events "turn", "done turn", "error turn", "scan", "done scan", "error scan", and "counter".

Figure 4:
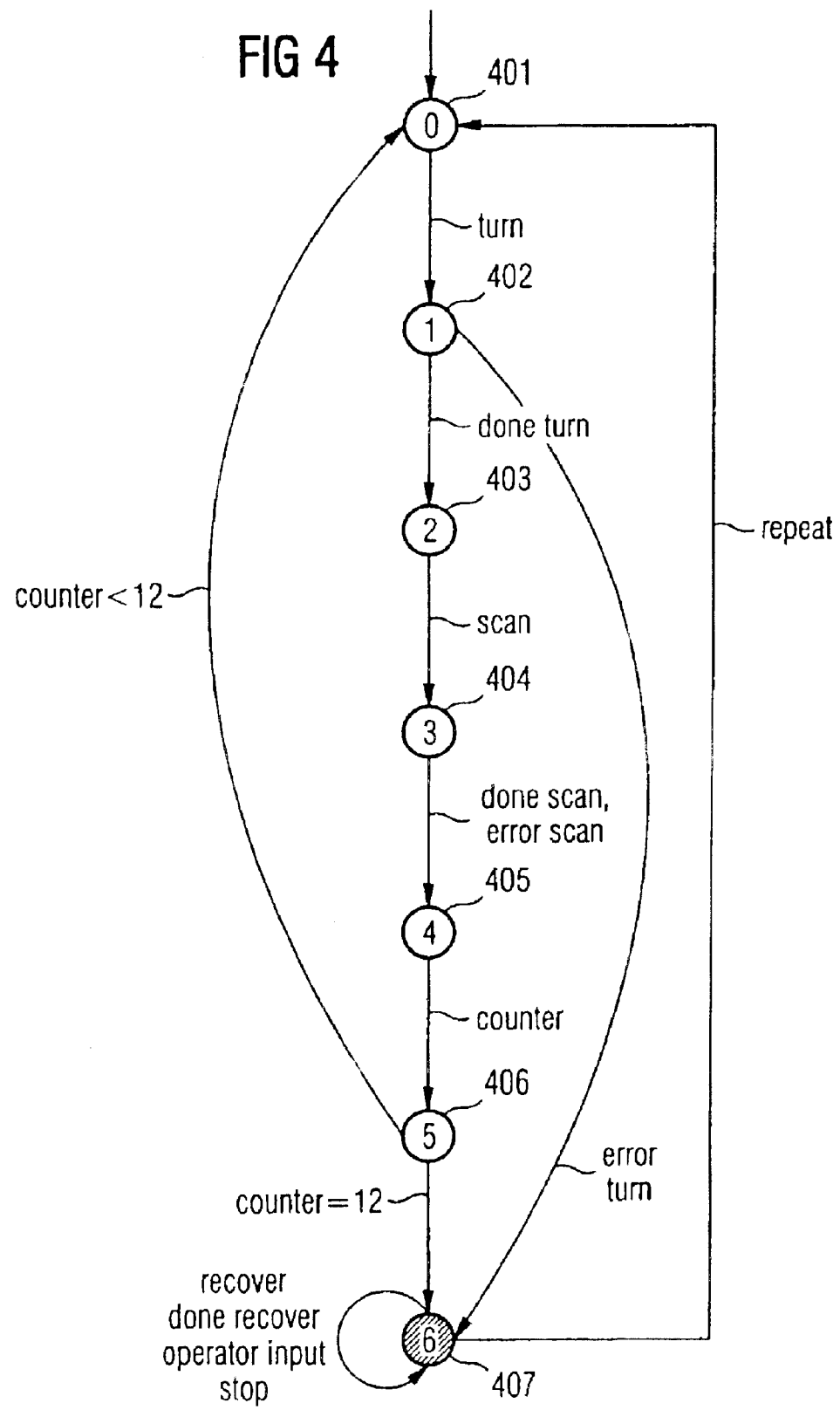
FIG. 4 is a state diagram showing the specific system behavior of the scan test.

FIG. 4 shows a state machine which represents the specific system behavior of the scan test 104. An initial state 401 is changed to a state 402 by a "turn" command. If the turning of the turret head 101 is ended, the machine changes from state 402 to a state 403. If an error occurs during the turn ("error turn"), state 402 changes to a state 407. From state 403, the "scan" command initiates a change to a state 404; when the scan test 104 is concluded, the machine changes from state 404 to a state 405. Incrementing a counter changes state 405 to a state 406. A check is then made to determine whether the counter has already reached a particular value, e.g., 12 for a turret heat having 12 pipettes. If this is so, state 406 is changed to state 407; if the counter exhibits a smaller value than 12, state 406 changes to state 401. Various commands ensure that state 407 is kept: "recover", "done recover", "operator input", and "stop". A "repeat" command causes the process to be repeated in that state 407 is changed to state 401.

A next step 202 in FIG. 2 ensures a validation of the control of the complete process by automatically verifying characteristics of the complete process. Such characteristics are, in particular, a blocking or non-blocking characteristic and a controllability characteristic. If various individual processes are operating in parallel with one another and if these individual processes share one or more resources (in this case the turning of the turret head 101), freedom from blocking is ensured if the individual processes can perform their tasks right to the end without impeding each other by accessing common resources. In the exemplary embodiment shown, the individual process scan test 104 and the individual process vacuum test 103 jointly use the resource "turning of the turret head 101". This could lead to mutual blocking if the control of the complete process does not avoid this in a preventative manner.

Furthermore, the validation 202 is carried out in that a plausibility check of the structuring 201 of the complete process to be controlled is effected by observation or simulation of the system and of the specific system behavior in the form of a state machine. Finally, predetermined characteristics are automatically verified. One of these characteristics is "after an error has occurred in scan test 104 (the event "error scan" was indicated), the "recovery" operation (the event "recover") always starts".

The validation 202, if it is not done completely and which formally verifies the undisturbed sequence of the individual processes, is repeated by branching back to step 201, the structuring of the functionalities of the individual processes. If the validation 202 is successful, code for controlling the complete process is automatically generated (compare change to step 203 in FIG. 2).

During this process, during the automatic generation of the control of the complete process, controllable events are allocated, in particular, to the linked function calls within the individual processes and thus to the associated program code fragments. Uncontrollable events are allocated to corresponding return values of function calls or output values of sensors. An example is represented by the function call of the event "scan" which relates to the corresponding program code fragment (C program routine "scan test) which comprises "scan error" or "scan done" as return values.

The automatic generation of the C code for controlling the complete process is determined from various state machines, allocations and/or program code fragments. The individual functionalities structured in step 201 correspond in this case to the corresponding state machines or, respectively, program code fragments.

As already mentioned, the vacuum test 103 and the scan test 104 are carried out in parallel, each test being performed at different physical locations (compare FIG. 1, noting the oppositely located performance of the two tests).

Figure 5:
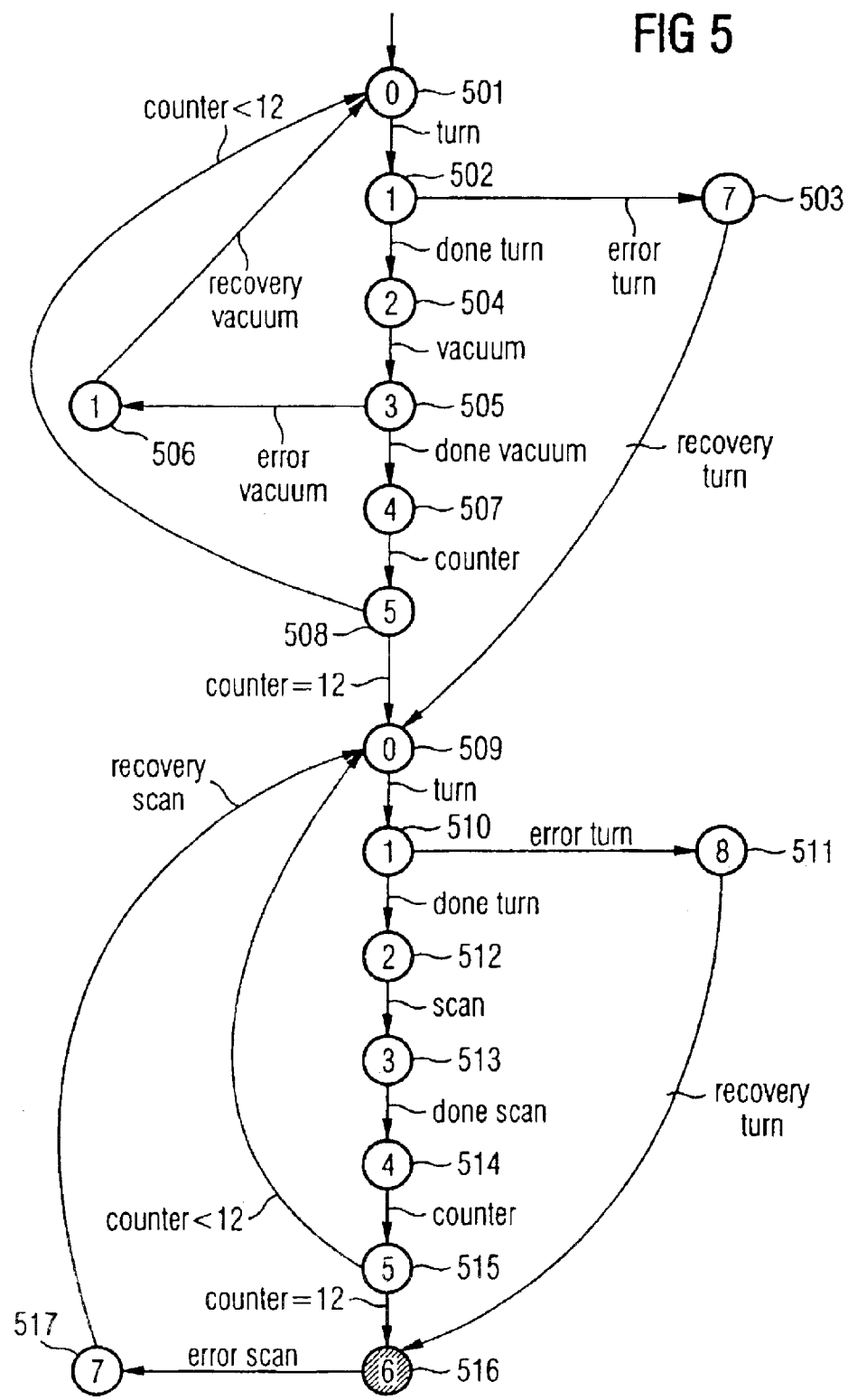
FIG. 5 is a state diagram showing a sequential processing of the vacuum test and of the scan test.
Figure 6:
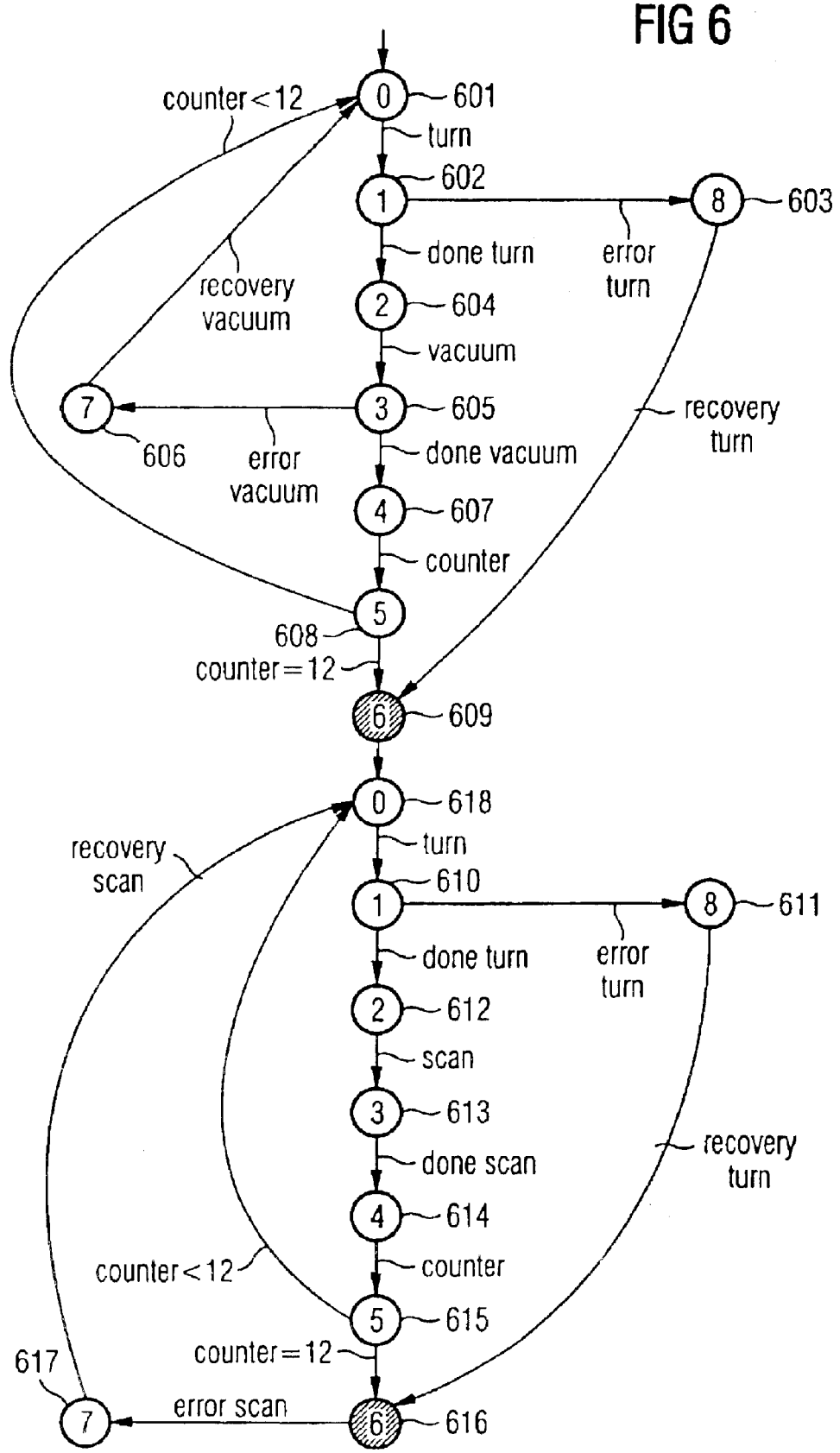
FIG. 6 is a state diagram illustrating two state machines which represent a parallel processing of the vacuum test and of the scan test.

FIGS. 5 and 6 show the desired behavior of the individual processes for the vacuum test 103 and the scan test 104, FIG. 5 showing a sequential processing of the two tests and FIG. 6 showing a parallel processing of the two tests. In the parallel processing in FIG. 6, blocking of the two individual processes can occur due to the fact that after the event "recovery vacuum", one of the two events "turn" or "counter" will not occur. As a result, a turning ("turn" command) of the cylinder head, which is needed by both individual processes running in parallel, is not guaranteed. One machine wants to turn the cylinder head, but the other machine wants to increment the counter, resulting in blocking. In contrast, sequential processing as indicated in FIG. 5 is possible, but the tests for 12 vacuum pipettes 102 each being performed in succession results in the cylinder head 101 having to be turned twice completely. The time expenditure for the sequential processing is far greater than for (almost) parallel processing.

On the basis of FIG. 4, FIG. 5 to FIG. 10 can be analogously understood. FIG. 5 comprises states 501 to 517, FIG. 6 comprises states 601 to 618, states 501 to 509 and 509 to 517 characterizing in each case the independent machines according to FIG. 6 which can run in parallel. The event which is in each case decisive for a state changing to another one is in each case indicated along the transition arrows in the figures.

Events having the same name occur synchronously in machines in which the respective event is defined. In the present exemplary embodiment, the event "scan" occurs if the state machine of the system behavior (compare FIG. 7) is in state "0" or, respectively, the state machine of the specific system behavior according to FIG. 8 is in state 801 or in state 802 and if the state machine of the specific system behavior according to FIG. 9 is in state 903.

Controllable events are: "turn", "scan", "vacuum", "recover", "recovery turn", "recovery scan", recovery vacuum", "counter", "operator input", and "reset". Uncontrollable events are: "done turn", "error turn", "done scan", "error scan", "done vacuum", "error vacuum", "done recover", "counter=12?", "counter<12?", "stop", and "repeat".

The respective state machine indicates the state in which the corresponding system behavior can be terminated, i.e., the state with a dark background defines a termination condition.

FIG. 7 shows as sequences of events which represent physically possible system states. Such physically possible behaviors are the turning of the cylinder head, the performance of the vacuum test, the performance of the scan test, the incrementing and interrogating of the counter and the inputting of a command which triggers a predetermined action. The state 0 in FIG. 7 characterizes both the initial state and the end state of the respective system behavior.

After the system behavior has been identified, the specific system behavior is determined which relates to a behavior of the complete process with regard to the task to be controlled. The associated state machine for the specific system behavior of the error recovery is shown in FIG. 8. In FIG. 8, there are marked states 801 to 807, where state 801 is simultaneously the start and an end state of the state machine. The specific system behavior "error recovery" can be terminated in each case in states 801 and 807. Items 803–806 indicate the following states: 803, system is recovering: 804, system has recovered: 805, system has received operator input: and 806, system is returning to initial state.

According to the above statements, the validation is then performed. To this end, a number of iterations which, finally, lead to the solution according to FIG. 7 to FIG. 9 are shown according to FIG. 2 (compare transition from validation 202 to structuring 201: iteration).

FIGS. 8 and 9 show the controlled specific system behavior corresponding to the predetermined functionality of the complete process. FIG. 9 illustrates states 901 and 907. Items 902–906 correspond to item numbers 402–406, respectively. It is noted that item numbers 902–906 describe the following states: 902, turret head 101 is being turned; 904, a vacuum is being applied; and 906, a counter has been incremented.

Three tasks have been identified which are executed in parallel: error recovery, scan test, and vacuum test. The error recovery, in particular, is only activated if both the scan test 104 and the vacuum test 103 occur in a marked state (compare state 807 in FIG. 8 or states 907 in FIG. 9 respectively). The scan test 104 and the vacuum test 103 are only activated if the error recovery is in the initial state (compare state 0 or 801 in FIG. 8).

The system behavior and the specific system behavior according to FIGS. 7-9 are non-blocking. Furthermore, the specific system behavior according to FIGS. 8 and 9 is controllable with respect to the system behavior from FIG. 7.

Figure 10:
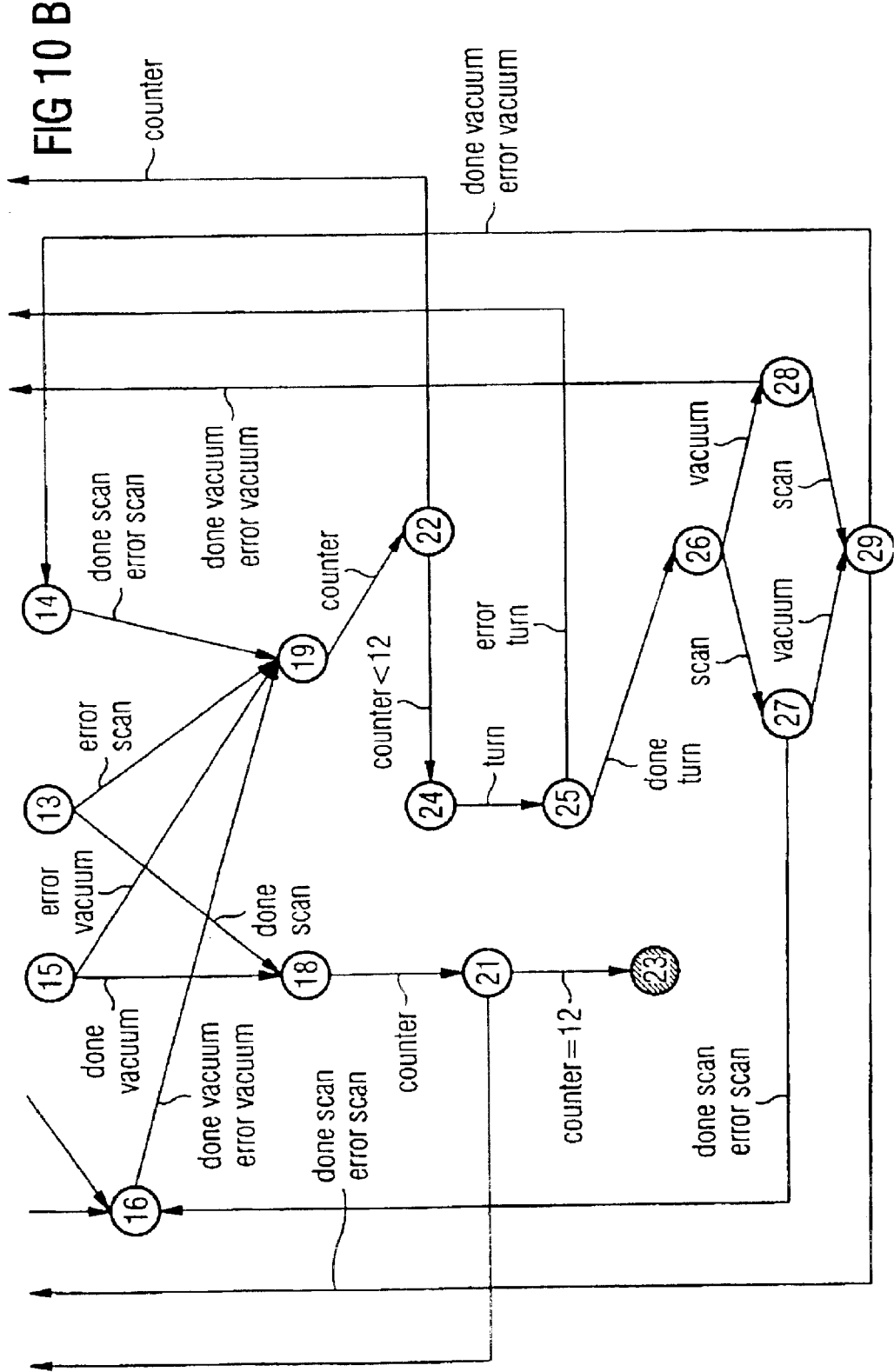
FIGS. 10A & B are parts of a state diagram showing the complete process.

In FIGS. 10A & B (collectively, FIG. 10), the complete process is assembled from the state machines according to FIGS. 7-9. FIG. 10 represents the product state machine of the state machines described above. In particular, the product state machine according to FIG. 10 is not used for structuring and solving the control task for the complete process since the easily traceable procedure, as described, guarantees a structured and clear approach to determining the data which are necessary for controlling the complete process.

The executable program code for controlling the complete process is automatically generated in that first function calls are assigned to the controllable events, the return values of the function calls or output values of sensors being assigned the corresponding uncontrollable events. The program code for controlling the complete process is generated from the state machine assignments and associated program code fragments.

The above-described method and arrangement are illustrative of the principles of the present invention. Numerous modifications and adaptations thereof will be readily apparent to those skilled in this art without departing from the spirit and scope of the present invention.

What is claimed is:

1. A method for designing a control of a complete process which comprises a number of individual processes, said method comprising the steps of:
   a) identifying functionalities of said individual processes, one or more of which is manifested at least in part by physical motion;
   b) generating a respective set of state transitions to represent each functionality;
   c) performing a validation by automatically verifying future interplay of said functionalities in accordance with an input to said complete process and producing a validation result; and
   d) determining data for future controlling of said complete process from said validation result.

2. The method as claimed in claim 1, further comprising the step of performing a sequence optimization.

3. The method as claimed in claim 1, further comprising the step of producing data for the future control in an executable code form.

4. The method as claimed in claim 1, wherein at least one of the functionalities is a software unit for controlling one or more of said individual processes, respectively.

5. The method as claimed in claim 1, wherein said validation result can indicate that one or more of said individual processes is an impeding physical process, an impeding physical process being defined as such if one of the following conditions is met:
   a) an individual process is blocked at least in part physically by an aspect of another individual process; and
   b) an individual process reaches an unauthorized physical state or a physical state endangering operation of said complete system.

6. The method as claimed in claim 1, wherein the complete process represents one or more operations performed by an automatic placement machine.

7. The method as claimed in claim 1, further comprising the step of controlling a technical installation with the data determined for controlling said complete process.

8. The method of claim 1, wherein a successful type of validation result indicates at least one of the following: that there are no impediments to any of said processes; and that each of said individual processes occupies only one or more authorized states, respectively.

9. An arrangement for designing the control of a complete process, comprising:
   a number of individual processes, one or more of which is manifested at least in part by physical motion; and
   a processor unit configured to provide:
   a) identification of functionalities of said individual processes;
   b) representation of each functionality by a respective set of state transitions;
   c) a validation, by automatically verifying future interplay of functionalities in accordance with an input to said complete process; and
   d) data from a result of said validation that is used for future controlling of said complete process.

10. The arrangement of claim 9, wherein the processor unit is further operable to perform a sequence optimization.

11. The arrangement of claim 9, wherein the processor unit is further operable to produce data for the future control in an executable code form.

12. The arrangement of claim 9, wherein at least one of the functionalities corresponds to a software unit for controlling one or more of said individual processes, respectively.

13. The arrangement of claim 9, wherein said validation result can indicate that one or more of said individual processes is an impeding physical process, an impeding physical process being defined as such if one of the following conditions is met:
   a) an individual process is blocked at least in part by an aspect of another individual process; and
   b) an individual process reaches an unauthorized physical state or a physical state endangering operation of said complete system.

14. The arrangement of claim 9, wherein the complete process represents one or more operations performed by an automatic placement machine.

15. The arrangement of claim 9, wherein the processor unit is further operable to control a technical installation with the data determined for controlling said complete process.

16. The arrangement of claim 9, wherein a successful type of validation result indicates at least one of the following: that there are no impediments to any of said processes; and that each of said individual processes occupies only one or more authorized states, respectively.

* * * * *